E. M. PACKARD.
FARMING IMPLEMENT.
APPLICATION FILED FEB. 16, 1917.
1,264,678.
Patented Apr. 30, 1918.
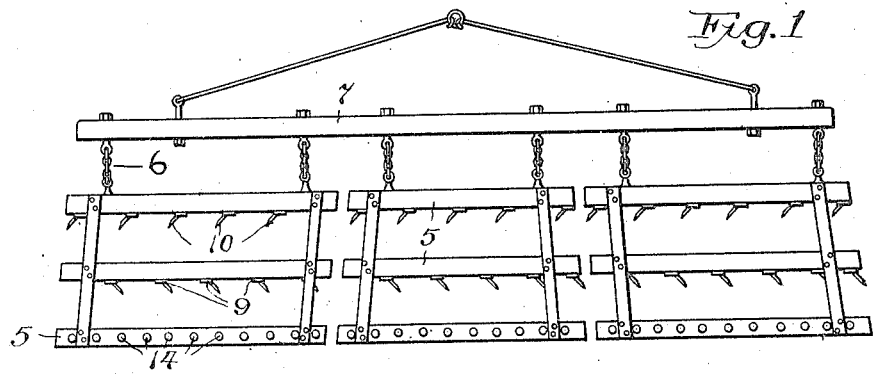
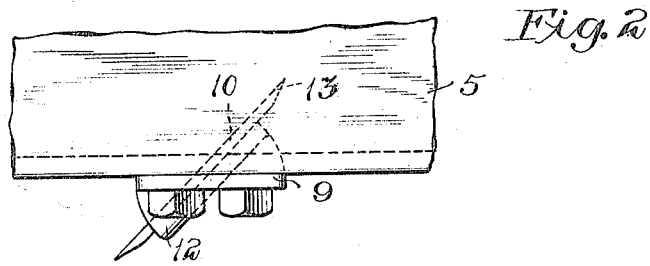
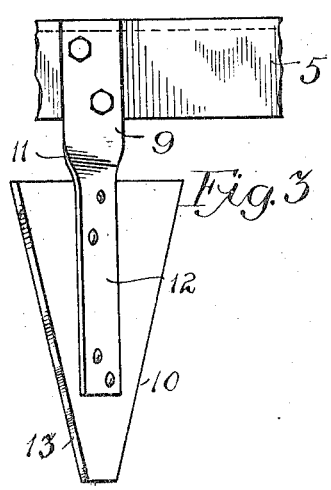
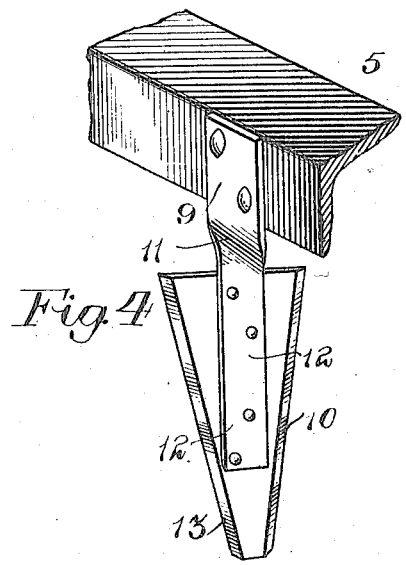
WITNESS:
INVENTOR.
Ernest M. Packard.
BY
ATTORNEY.

UNITED STATES PATENT OFFICE.

ERNEST M. PACKARD, OF CORNING, CALIFORNIA.

FARMING IMPLEMENT.

1,264,678.

Specification of Letters Patent.

Patented Apr. 30, 1918.

Application filed February 16, 1917. Serial No. 148,996.

*To all whom it may concern:*

Be it known that I, ERNEST M. PACKARD, a citizen of the United States, residing at Corning, in the county of Tehama, and State of California, have invented certain new and useful Improvements in Farming Implements, of which the following is a specification.

The present invention relates to an implement adapted to cut and stir the upper portion of the soil for the purpose of destroying the roots of weeds, etc., and putting the ground into proper condition for planting.

One object of the invention is to provide a series of carrier sections, each of which will have attached thereto a plurality of thin, sharp-edged tools which will be arranged diagonally to the direction of travel of the implement, so that they will cut and stir the roots and earth.

A further object of the invention is to arrange the tools on one section at an opposite angle from the angle of the tools on the next section.

A further object of the invention is to provide members in the form of rake-teeth for leveling the ground after the tools have acted upon it, and for bringing the cut roots of the weeds, etc., to the surface.

The invention further consists in the features of construction and combination of parts hereinafter described and claimed.

In the drawings:

Figure 1 is a plan view of an implement made in accordance with the present invention;

Fig. 2, a plan view showing one of the tools in mounted position;

Fig. 3, a rear view of a part of one of the sections with a tool in place; and Fig. 4, a perspective of a portion of a section with a tool mounted thereon.

In the art to which the present invention relates, it is advantageous in the preparation of ground previous to seeding, to extract the small roots of weeds, etc., so as to prevent their growing and intermingling with the crop; and by severing the roots, they will be more effectively pulled from the ground and destroyed as the ground is turned over by the action of the tools.

Referring now to the drawings, the invention comprises a series of sections 5, which may be termed carrier sections; and these sections are connected together by a suitable form of coupling or connecting member 6. Each of the sections is attached to a draft bar 7, to which are joined the usual draft appliances to enable the implement to be pulled.

Each of the carrier sections 5 is formed of an angle iron in the construction shown; and attached to the rear face of the angle iron are a plurality of vertically-depending, strap-like members 9, which serve as holders for a tool 10. These holders 9 are bent midway their length, as at 11, so that the lower end 12 is standing at approximately forty-five degrees to the plane of the upper portion of the holder. The tools 10 are attached to the lower end 12 of the holder, and will therefore extend at the same angle as the angle of said lower end. This will place them at approximately forty-five degrees angle to the carriers 5, and also at a similar angle to the line of draft, presenting the side face of the tool for enabling it to turn over the earth as the implement is drawn forward.

The tools are of a relatively thin, blade-like nature, containing a sharp edge 13. As the implement is moved forward, these sharp, blade-like edges cut the earth and sever whatever roots may be within its path. Then, owing to the angularity of the blade-like member, it will act to turn the earth up during such forward travel, thus mixing the earth and dislodging the several roots.

By referring to the drawings, it will be seen that the tools 10 on the second of the sections 5 are extending in a direction of opposite angularity to the tools on the first section. This tends to move the earth which is turned up, first in one direction, and then in the other, bringing about a thorough mixing and disintegration, and tending to work the roots loose from the earth, whereby they are more readily brought to the surface.

Attached to the rearmost of the sections 5 are a plurality of teeth 14, which act after the manner of a rake, to level the ground turned up by the tools 10, and also to bring to the surface the cut and torn up roots, where they will be dried and destroyed.

The implement as a whole is very cheap and simple of construction, and will be found to be durable in use; and owing to the thin, sharp-edged tools employed, the ground will be cut and turned in a manner so as to effectively destroy all weeds that may be encountered.

I claim:

In combination with a harrow frame, a ground cutting and stirring tool comprising a depending metal strip secured at one end to said frame and twisted at a point close to the bottom edge of said frame to have the remainder thereof turned crosswise of the frame, a tool member composed of a thin, sharp-edged piece of metal secured to said strip and extending from the point of twist therein to a point beyond the lower end of the strip, said twist placing the tool at an angle to the frame to present a sharp cutting edge extending downward from a point close to the bottom of the frame and at an angle to the line of draft, whereby a substance is prevented from collecting about the said strip and impeding the progress of the machine, substantially as described.

ERNEST M. PACKARD.

Copies of this patent may be obtained for five cents each, by addressing the "Commissioner of Patents, Washington, D. C."